US005635283A

United States Patent [19]

Lovison

[11] Patent Number: 5,635,283

[45] Date of Patent: Jun. 3, 1997

[54] TRADING CARD WITH IRIDESCENT SUBSTRATE

[75] Inventor: Douglas I. Lovison, Carlsbad, Calif.

[73] Assignee: Signs & Glassworks, Inc., Vista, Calif.

[21] Appl. No.: 311,766

[22] Filed: Sep. 23, 1994

[51] Int. Cl.$^6$ .............................................. B32B 3/00

[52] U.S. Cl. .......................... 428/195; 428/201; 428/204; 428/411.1; 428/488.1; 428/913

[58] Field of Search ................................ 428/195, 411.1, 428/485, 201, 203, 204, 211, 537.5, 688, 690, 488.1, 913; 427/195

[56] References Cited

U.S. PATENT DOCUMENTS

| | | | |
|---|---|---|---|
| 1,694,847 | 12/1928 | Donaldson . | |
| 1,867,314 | 7/1932 | Gurwick . | |
| 2,065,406 | 12/1936 | Silverman . | |
| 2,235,791 | 3/1941 | Wohlers . | |
| 3,751,319 | 8/1973 | Green . | |
| 3,912,842 | 10/1975 | Swartz . | |
| 4,337,590 | 7/1982 | Jackson . | |
| 4,567,072 | 1/1986 | Brainard . | |
| 4,597,210 | 7/1986 | Kitrell . | |
| 4,721,635 | 1/1988 | Helinski . | |
| 5,223,357 | 6/1993 | Lovison | 430/1 |
| 5,407,711 | 4/1995 | Lovison et al. | 428/13 |

FOREIGN PATENT DOCUMENTS

| | | |
|---|---|---|
| 298687 | 1/1987 | European Pat. Off. . |
| 2107361 | 4/1983 | United Kingdom . |

*Primary Examiner*—William Krynski

*Attorney, Agent, or Firm*—Nydegger & Associates

[57] ABSTRACT

An iridescent sign and its method of manufacture requires a transparent substrate having a design printed thereon using a four-color process. A transparent film, having a pigment printed thereon, is laminated to the substrate with the design positioned between the substrate and the film. To obtain additional visual effects for the sign, selected portions of the substrate may be textured. Additionally, certain portions of the design can be masked with an opaque ink to give the masked portions a flat appearance while the remained of the sign retains its iridescent qualities.

6 Claims, 1 Drawing Sheet

TRADING CARD WITH IRIDESCENT SUBSTRATE

FIELD OF THE INVENTION

The present invention pertains generally to signs and visual displays. More particularly, the present invention pertains to signs and displays which present an iridescent visual sensation. The present invention is particularly, but not exclusively, pertinent to novelty items, such as sports trading cards and magazine covers, which rely on a unique and sensational visual presentation to attract attention.

BACKGROUND OF THE INVENTION

Advertising and sales of many products require, in part, that the product provide a unique and sensational visual presentation in order to attract attention of the consumer. Additionally, many products, such as sports trading cards and comic magazines, retain value due to their uniqueness. Consequently, many attempts have been made to make such products attractive to the consuming public.

The techniques and processes for manufacturing signs and displays which have unique visual effects are many and varied. For example, U.S. Pat. No. 5,106,126 for an invention entitled "Process Printed Image with Reflective Coating" incorporates a metallic reflective layer with masked portions behind the design on a transparent substrate to achieve a unique visual effect. As another example, U.S. Pat. No. 4,933,218 for an invention entitled "Sign with Transparent Substrate" incorporates an extraordinarily thick ridge of ink along the border of a design, under a transparent substrate, to achieve another particularly unique visual effect.

The present invention recognizes that a particularly unique visual effect is achieved with a sign or display, when light is not only reflected from the sign or display, but when light is also able to come through the sign or display from the back of the sign or display. Light from the back of the display is, of course, the familiar "back lighting" effect. The present invention also recognizes that the back lighting effect can be achieved for products which do not rely on artificial lighting. Indeed, many products such as sports trading cards have heretofore relied on reflective light for the presentation of their design images. Further, the present invention recognizes that by properly selecting and manufacturing the various layered components which comprise a product, such as a sports trading card, the back light effect can be enhanced with the suggestion of iridescence.

In light of the above, it is an object of the present invention to provide a display/sign which incorporates a back light effect without the use of an artificial light source. Another object of the present invention is to provide a display/sign which has an iridescent effect in its visual presentation. Still another object of the present invention is to provide a display/sign which is relative easy to manufacture, and comparatively cost effective.

SUMMARY OF THE INVENTION

An iridescent display, in accordance with the present invention includes a substantially flat transparent substrate which is made from a semi-rigid material, such as a plastic. A design is printed onto a surface of the substrate using translucent inks. Preferably, the printing of the design is accomplished using a four-color process wherein red, yellow, blue and black dots are juxtaposed to create the particularly desired color effect for the design. Also, selected portions of the substrate surface on which the design is printed may be textured to give those parts of the design a roughened appearance. In keeping with the present invention, this texturing can be accomplished by physical alteration of the substrate surface by using ink deposits in a manner well known in the art.

In addition to texturing selected portions of the substrate, a masking layer may be deposited onto the substrate over certain portions of the design. A white ink is suitable for this purpose. Against the translucent inks of the design, these masked portions give the design a flat appearance in contrast with the unmasked portions of the design. As intended for the present invention the masked portions of the design may or may not coincide with the textured portions of the substrate. Thus, there are many possible variations and design configurations which are possible for the present invention.

A transparent backing, which is preferably a plastic film, is laminated against the substrate with the design and any masked or textured portions positioned between the substrate and the backing. For the present invention, this transparent backing is pre-printed with a pigment which will give light passing through the backing an iridescent effect.

The iridescent display of the present invention achieves its unique visual effects by combining, as desired, the flat appearance of the masked portions, the roughened appearance of the textured portions, and the overall iridescence provided by the pigment printed backing. Further, the unique visual effects of the iridescent display of the present invention are achieved with light which is reflected from the display together with light which comes through the display from behind the display. These effects are possible in both natural and artificial light.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENTS

Figure 1:
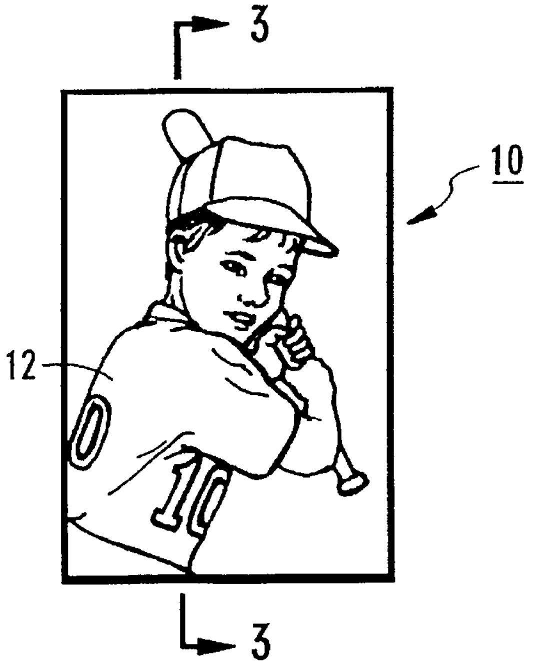
FIG. 1 is an elevational view of a display (sports trading card) according to the present invention.

Referring initially to FIG. 1, a display/sign/trading card according to the present invention is shown and generally designated 10. As shown, the display 10 has a design 12 which is viewed by the user. The iridescent visual effect of the display 10, obviously, can not be shown in FIG. 1. Therefore, the construction of display 10 which accomplishes this effect is as set forth below.

Figure 2:
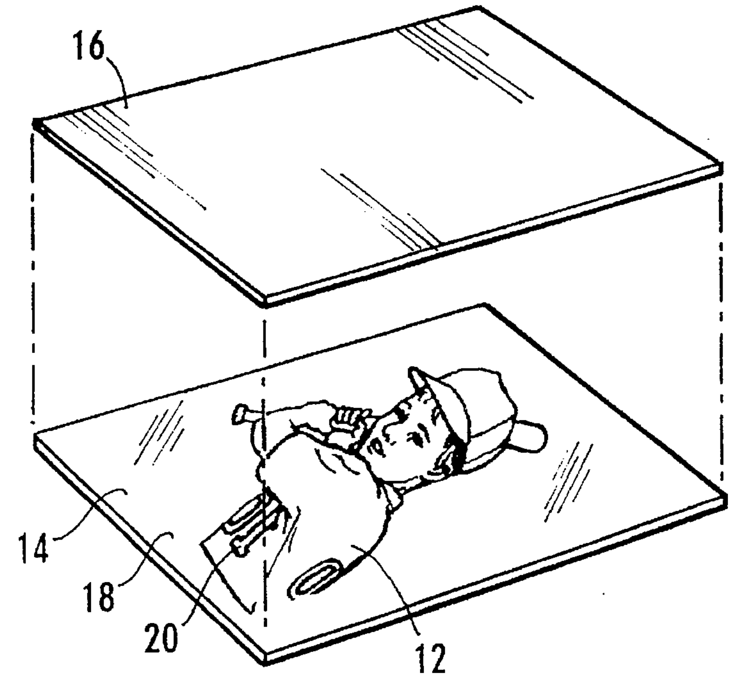
FIG. 2 is an exploded perspective view of the present invention showing the backing separated from the substrate.

In FIG. 2 it will be seen that display 10 includes, essentially, two structural components. These are a substrate 14 and a backing sheet 16. For purposes of the present invention, the substrate 14 is preferably made of a clear, transparent, semi-rigid plastic. Substrate 14 is generally flat and, as shown in the drawings, can be generally rectangular shaped. Backing sheet 16 is also preferably made of a plastic. Backing sheet 16, however, is a very thin plastic film. Further, backing sheet 16 has a pigment printed thereon (not shown) to give the backing sheet 16 an iridescent visual effect. The printing of pigment on backing sheet 16 can be accomplished in any manner well known in the pertinent art.

Still referring to FIG. 2, it will be seen that the design 12 is printed on a surface 18 of the substrate 14. Preferably, design 12 is printed on surface 18 using the well known four-color process. According to the four-color printing process individual red, yellow, blue and black dots of ink are juxtaposed to create the particular color effect for design 12. For purposes of the present invention, the inks used for design 12 are translucent. As also indicated in FIG. 2, a masking layer 20 can be printed or deposited onto selected portions of the design 12. By way of example, the numeral 1 on the players jersey can be considered as masked by masking layer 20. The masking layer 20 is substantially opaque, and preferably comprises a white ink which will give the portions of design 12 which have been masked by the masking layer 20 a flat visual effect. This flat visual effect is presented on design 12 by the layer 20 to provide a contrast to the remaining unmasked portions of the design 12. For the present invention, the unmasked portions of design 12 will be translucent and iridescent.

Figure 3:
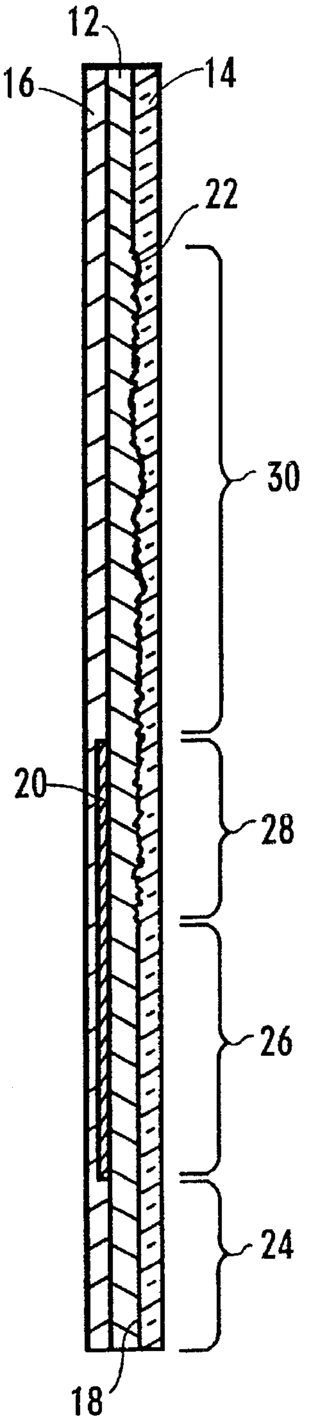
FIG. 3 is an exemplary cross sectional view of the display of the present invention as seen along the line 3—3 in FIG. 1.

In addition to the ink design 12 on substrate 14, and the masked portions of design 12 created by masking layer 20, FIG. 3 indicates that portions of surface 18 of substrate 14 can also be textured with inks, to give the display 10 a roughened appearance in the areas 22 where the surface 18 is textured. With a design 12 printed on surface 18; with predetermined areas 22 of surface 18 textured; and selected portions of the design 12 masked by the masking layer 20; the backing sheet 16 is laminated to substrate 14. Preferably, the laminating process is accomplished by using a thermal or pressure sensitive adhesive.

In accordance with the above, and as best appreciated with reference to FIG. 3, display 10 can have several visual effects. For example, in the region 24 only the translucent inks of design 12 are positioned between the clear transparent substrate 14 and the iridescent pigment printed backing sheet 16. This construction gives a purely iridescent visual effect to the design 12. In the region 26, however, the masking layer 20 is behind the translucent inks of design 12. In this region 26, masking layer 20 blocks the iridescence of backing sheet 16 and gives the design 12 a relatively flat appearance. With the addition of a textured area 22 in region 28, the relatively flat appearance is given a roughened appearance. Finally, in region 30, where there is no more masking layer 20, but there is a textured area 22, the iridescence of backing sheet 16 again gives an iridescent visual effect to design 12. This time, however, due to textured area 22, the iridescence of design 12 has a roughened effect.

While the particular Trading Card with Iridescent Substrate as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. An iridescent display sign which comprises:

a transparent substrate, said substrate being substantially flat and having a first surface and a second surface;

a design printed onto said second surface of said substrate, said design being formed with translucent inks;

a transparent backing having a surface; and an iridescent pigment printed over said entire surface of said backing, said iridescent pigment printed backing being laminated to said second surface of said substrate with said design and said iridescent pigment positioned between said backing and said substrate to give said design an iridescent visual effect by light reflected from said iridescent pigment and by light passing through said backing.

2. A display as recited in claim 1 further comprising a masking layer selectively deposited on portions of said design to be masked, said masking layer being opaque and deposited between said design and said backing to block light transmission from said backing through said masked portions of said display to give said masked portions of said display a relatively flat appearance when viewed through said first surface.

3. A display as recited in claim 2 wherein said masking layer is created using a white ink.

4. A display as recited in claim 1 wherein selected portions of said second surface of said substrate are textured to present portions of said design having a roughened visual effect.

5. A display as recited in claim 1 wherein said design is printed on said substrate using a process printing wherein a plurality of colored dots are juxtaposed to create the appearance of a particular color for said design.

6. A display as recited in claim 5 wherein said dots are red, yellow, blue, or black in color.

* * * * *